US008498573B2

(12) United States Patent
Eisinger et al.

(10) Patent No.: US 8,498,573 B2
(45) Date of Patent: Jul. 30, 2013

(54) DYNAMIC CHANGES TO A USER PROFILE BASED ON EXTERNAL SERVICE INTEGRATION

(75) Inventors: Jacob D. Eisinger, Austin, TX (US); Michael C. Hollinger, Round Rock, TX (US); Jennifer E. King, Austin, TX (US); Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/829,644

(22) Filed: Jul. 2, 2010

(65) Prior Publication Data

US 2012/0003931 A1    Jan. 5, 2012

(51) Int. Cl.
*H04B 7/00* (2006.01)

(52) U.S. Cl.
USPC ............... 455/41.2; 455/550.1; 455/556.2; 455/557; 455/414.1; 370/342; 340/506; 340/531

(58) Field of Classification Search
USPC .............. 455/41.2, 550.1, 556.2, 557, 414.1, 455/419
See application file for complete search history.

(56) References Cited

U.S. PATENT DOCUMENTS

| | | | |
|---|---|---|---|
| 6,064,980 A | 5/2000 | Jacobi et al. | |
| 6,266,649 B1 | 7/2001 | Linden et al. | |
| 6,317,722 B1 | 11/2001 | Jacobi et al. | |
| 6,678,516 B2 * | 1/2004 | Nordman et al. | 455/414.1 |
| 6,873,967 B1 | 3/2005 | Kalagnanam et al. | |
| 7,130,814 B1 | 10/2006 | Szabo et al. | |
| 7,263,529 B2 * | 8/2007 | Cordery et al. | 1/1 |
| 7,266,583 B2 * | 9/2007 | Fitzpatrick et al. | 709/205 |
| 7,319,858 B2 * | 1/2008 | Lewis | 455/412.2 |
| 7,323,991 B1 * | 1/2008 | Eckert et al. | 340/572.1 |
| 7,454,195 B2 * | 11/2008 | Lewis et al. | 455/412.1 |
| 7,545,784 B2 * | 6/2009 | Mgrdechian et al. | 370/338 |

(Continued)

FOREIGN PATENT DOCUMENTS

WO    2007/003045 A1    1/2007

OTHER PUBLICATIONS

BlackBerry Java Application Integration Version 5.0 Beta Development Guide, Section 5, pp. 38-52, published Nov. 9, 2009, Research in Motion, Canada.

(Continued)

*Primary Examiner* — Marceau Milord
(74) *Attorney, Agent, or Firm* — Yee & Associates, P.C.; Arthur J. Samodovitz

(57) ABSTRACT

The different illustrative embodiments provide a method, system, and program product for dynamic changes to a user profile based on external service integration. The method, system and program product comprise establishing a direct two-way communication between a first mobile device and a second mobile device when a first mobile device direct transceiver and a second mobile device direct transceiver are within a range of each other. A number of data is gathered from a number of internal sources or a number of external sources. An analysis of the number of data to determine a modification to a first list stored in the first device is performed. A modified first list is generated based on the analysis. The modified first list is automatically sent from the first mobile device to the number of second devices responsive to establishing the direct two-way communication between the first mobile device and a number of second devices.

20 Claims, 9 Drawing Sheets

U.S. PATENT DOCUMENTS

| | | | |
|---|---|---|---|
| 7,586,859 B2 * | 9/2009 | Petrovykh | 370/270 |
| 7,689,473 B2 | 3/2010 | Borom et al. | |
| 7,720,723 B2 | 5/2010 | Dicker et al. | |
| 7,831,199 B2 | 11/2010 | Ng et al. | |
| 7,885,222 B2 * | 2/2011 | Cole | 370/328 |
| 8,074,230 B2 | 12/2011 | Mayer | |
| 8,126,477 B2 * | 2/2012 | Dravida et al. | 455/456.3 |
| 8,175,645 B2 * | 5/2012 | Evans et al. | 455/557 |
| 8,228,861 B1 * | 7/2012 | Nix | 370/329 |
| 8,238,327 B2 * | 8/2012 | Schneider et al. | 370/352 |
| 2003/0105682 A1 | 6/2003 | Dicker et al. | |
| 2004/0093274 A1 | 5/2004 | Vanska et al. | |
| 2006/0097044 A1 | 5/2006 | Boyd et al. | |
| 2006/0230037 A1 | 10/2006 | Sugiyama et al. | |
| 2007/0161402 A1 | 7/2007 | Ng et al. | |
| 2007/0203807 A1 | 8/2007 | DeAngelis | |
| 2008/0062940 A1 | 3/2008 | Othmer et al. | |
| 2008/0140788 A1 | 6/2008 | Carter et al. | |
| 2008/0160910 A1 | 7/2008 | Khedouri et al. | |
| 2008/0235005 A1 | 9/2008 | Golan et al. | |
| 2008/0305813 A1 * | 12/2008 | Rao | 455/466 |
| 2009/0011743 A1 * | 1/2009 | Johanson et al. | 455/414.1 |
| 2009/0076912 A1 * | 3/2009 | Rajan et al. | 705/14 |
| 2009/0089806 A1 | 4/2009 | Mayer | |
| 2009/0112982 A1 * | 4/2009 | Kuhlmann et al. | 709/204 |
| 2009/0191898 A1 * | 7/2009 | Lewis et al. | 455/456.3 |
| 2009/0228513 A1 | 9/2009 | Tian | |
| 2009/0240518 A1 | 9/2009 | Borom et al. | |
| 2009/0271284 A1 | 10/2009 | Arbib | |
| 2009/0292785 A1 | 11/2009 | Leedberg et al. | |
| 2010/0030619 A1 * | 2/2010 | Ofer et al. | 705/10 |
| 2011/0202401 A1 | 8/2011 | Magadi et al. | |
| 2011/0246332 A1 | 10/2011 | Alcodray | |
| 2012/0003965 A1 | 1/2012 | Eisinger et al. | |
| 2012/0004954 A1 | 1/2012 | Eisinger et al. | |
| 2012/0022944 A1 | 1/2012 | Volpi | |

OTHER PUBLICATIONS

Bai et al., "FD/I-Based personalized recommendation in Context-aware Application", 2007 International Conference on Multimedia and Ubiquitous Engineering, IEEE 2007, pp. 1-6.

Menasalvas et al., "Context-aware recommendations in ubiquitous devices", ECML 2008, Madrid, Spain, pp. 1-12.

Park et al., "Location-Based Recommendation System Using Bayesian user's Preference Model in Mobile Devices", UIC 2007, LNCS 4611, pp. 1130-1139, Springer-Verlag, 2007.

Ferscha et al., "Context-Aware Profiles", 2006 International Conference on Autonomic and autonomous Systems ICAS'06, San Jose, CA Jul. 2006, pp. 1-8.

Ferscha, "Everyobjects in the Pervasive Computing Landscape", OTM Confederated International Conferences, CoopIS, Montpellier France, 2006, Abstract, 1 page.

"Google Reader", 1 page, retrieved May 3, 2010 google.com.

"Mobile marketing" Wikipedia, pp. 1-7, retrieved May 4, 2010.

Yee, "New perspectives on the shared cataloging environment and a MARC 21 shopping list", pp. 1-43, Jul. 2004, Postprints, UC Los Angeles.

Roussos et al., "Designing appliances for mobile commerce and retailtainment", Pers Ubiquit Comput (2003) pp. 203-209.

"Method and System for Facilitating a Merchant to Electronically Distribute Cooperative Coupons Associated with Promotional Offers to Mobile Devices of Consumers", Jun. 4, 2010, IP.com 196511D, pp. 1-5.

"Method and System for Aggregating Preference Tags associated with Users and Electronically Sharing Preference Tags Clouds with Service Providers and Users", Jun. 3, 2010, IP.com 196487D, pp. 1-6.

"Method and System for Enabling Consumers to Trade Electronically Distributed Coupons", Jun. 4, 2010, IP.com 196512D, pp. 1-5.

"Method and system for Electronic Dissemination of Proximity-based Personalized Advertisements", Jun. 4, 2010, IP.com 196509D, pp. 1-4.

"Method and System for Electronically Distributing Coupons for Promotional Offers" Jun. 4, 2010, IP.com 196513D , pp. 1-5.

U.S. Appl. No. 12/829,589, filed Jul. 2, 2010, Eisinger et al.

U.S. Appl. No. 12/829,608, filed Jul. 2, 2010, Eisinger et al.

Office Action regarding U.S. Appl. No. 12/829,589, dated Feb. 2, 2012, 16 pages.

Office Action regarding U.S. Appl. No. 12/829,608, dated Jan. 9, 2012, 14 pages.

Notice of Allowance regarding U.S. Appl. No. 12/829,608, dated May 25, 2012, 7 pages.

Final Office Action issued on Jul. 19, 2012 for U.S. Appl. No. 12/829,589, 15 pages.

* cited by examiner

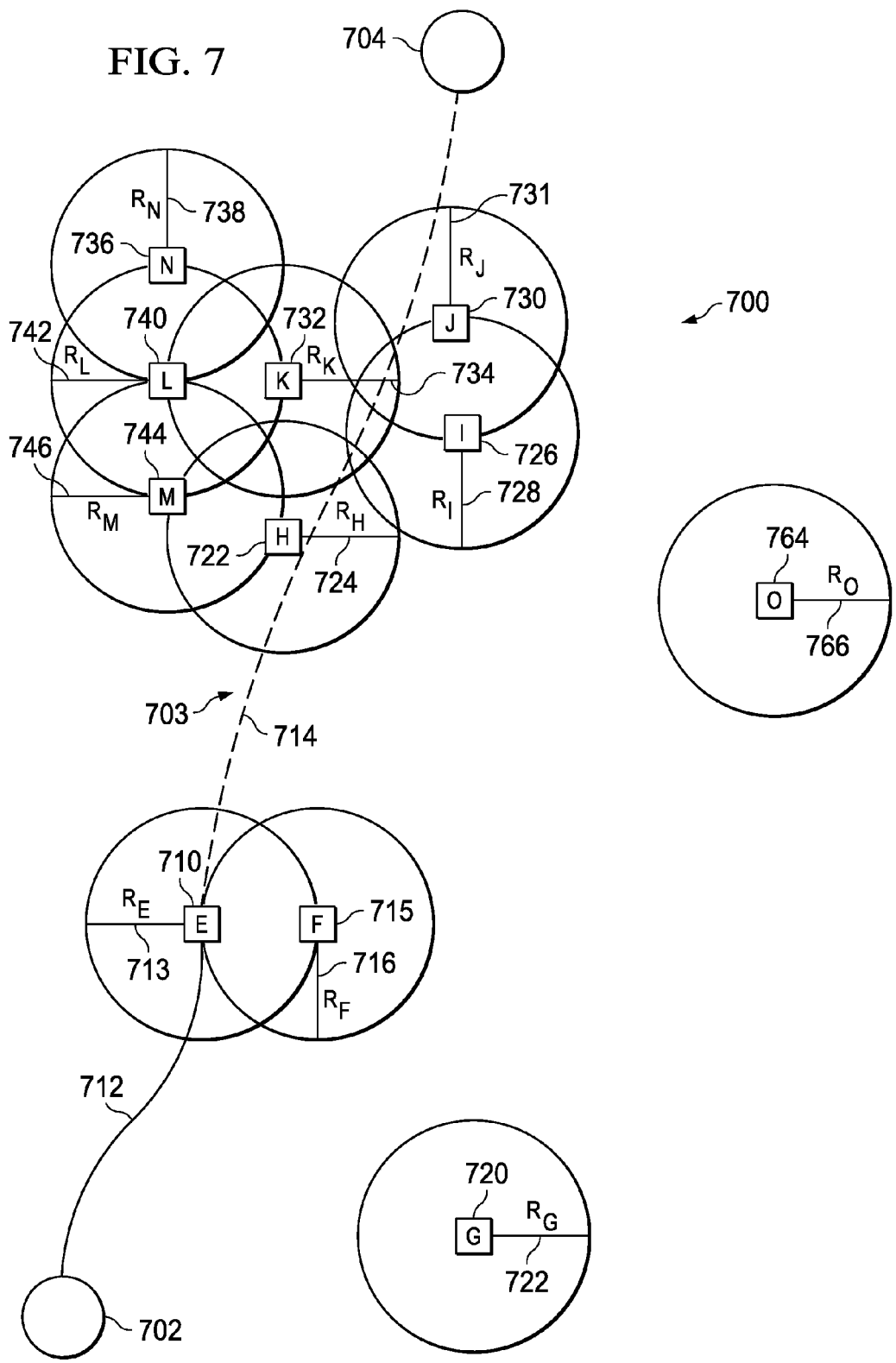

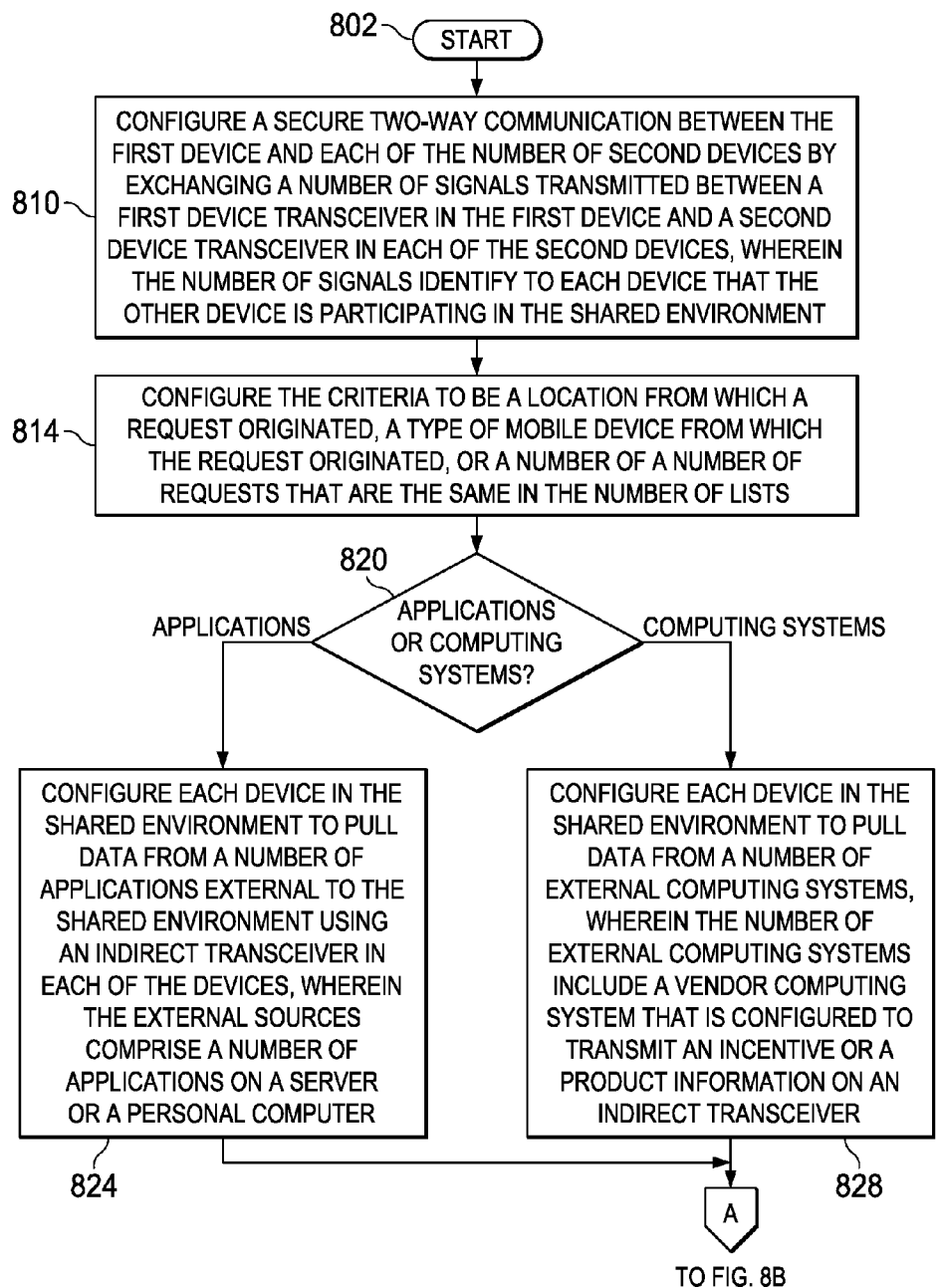

DYNAMIC CHANGES TO A USER PROFILE BASED ON EXTERNAL SERVICE INTEGRATION

BACKGROUND

1. Field

The disclosure relates generally to telecommunications and more specifically to direct communication between mobile devices for file sharing.

2. Description of the Related Art

Mobile devices and smart phones are platforms for innovation, software services, viral marketing and advertising distribution. Viral dissemination of information among proximate devices via remote communication such as Bluetooth is one method of performing these functions.

Information may be exchanged among mobile devices in a number of ways. One way is by direct communication between two mobile devices that are located in positions within range of each other. Another way is by indirect communication through wireless connections and the Internet. Indirect communication allows integration of external services to the mobile devices. Direct and indirect communications use different transceivers, and so coordination of data between the two types of communication raises issues in coordination, configuration, and management.

Therefore, it would be desirable to have a method, apparatus, and computer program code that may overcome one or more of the issues described above, as well as other possible issues.

SUMMARY

The different illustrative embodiments provide a method for dynamic changes to a user profile based on external service integration. The method comprises establishing a direct two-way communication between a first mobile device and a second mobile device when a first mobile device direct transceiver and a second mobile device direct transceiver are within a range of each other. A number of data are gathered from a number of internal sources or a number of external sources. An analysis of the number of data to determine a modification to a first list stored in the first device is performed. A modified first list is generated based on the analysis. The modified first list is automatically sent from the first mobile device to the number of second devices responsive to establishing the direct two-way communication between the first mobile device and a number of second devices.

BRIEF DESCRIPTION OF THE SEVERAL VIEWS OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 7 is a display diagram of a share environment in accordance with the illustrative embodiments;

FIGS. 8A and 8B are a flowchart of a configuration process in accordance with the illustrative embodiments;

DETAILED DESCRIPTION

Figure 1:
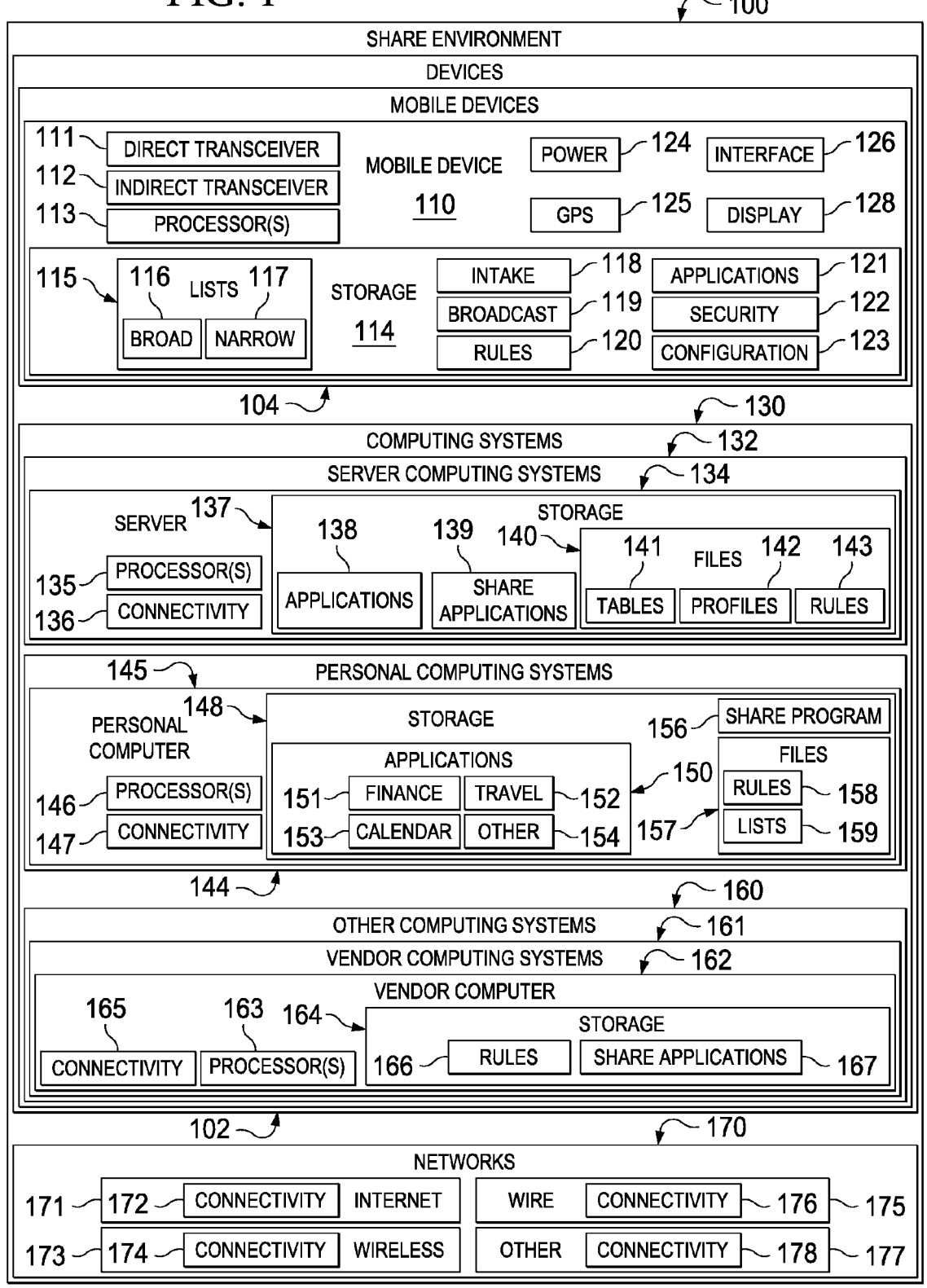
FIG. 1 is a share environment in which illustrative embodiments may be implemented.

FIG. 1 is a block diagram of a share environment in accordance with the illustrative embodiments. As used herein, a "share environment" is an environment in which mobile devices are configured to communicate directly via direct communication transceivers when one mobile device is within range of another mobile device and indirectly, without regard to the range of either devices direct communication transceiver, via indirect communication transceivers in each mobile device. Share environment 100 may comprise devices 102 and networks 170. Devices 102 may comprise mobile devices 104 and computing systems 130. As used herein, "a number" means one or more of an item. Mobile devices 104 may comprise a number of mobile devices such as mobile device 110. Mobile device 110 may comprise direct transceiver 111, indirect transceiver 112, a number of processors 113, storage 114, power supply 124, geophysical positioning system 125, and interface 126. Additional illustrative examples of mobile devices are mobile devices 210 and 230 in FIG. 2. Storage 114 may comprise lists 115, intake 118, broadcast 119, rules 120, applications 121, security 122, and configuration 123. Lists 115 may comprise broad 116 and narrow 117. The illustrative embodiments recognize and take into account use of "Wish to Have" and "Key Need" lists. The "Wish to Have" list is defined as a list of categories of information that the user is interested in. The "Key Need" list refers to information that the user really wants to have information about. The illustrative embodiments recognize and take into account the desirability of dynamically changing a user's "Wish to Have" list based on popularity of requests and various other configurable options relating to the devices in aggregate that a user has been in proximate connection with. In an illustrative example, broad list 116 may be a "Wish to Have" list and narrow list 117 may be a "Key Need" list.

Computing systems 130 may comprise server computing system 132, personal computing systems 144 and other computing systems 160. Server computing systems 132 may comprise a number of servers such as server 134. Server 134 may comprise a number of processors 135, connectivity 136, and storage 137. Storage 137 may comprise applications 138, share applications 139, and files 140. Files 140 may comprise tables 141 and profiles 142.

Personal computing systems 144 may comprise a number of personal computers such as personal computer 145. Personal computer 145 comprises processors 146, connectivity 147, and storage 148. Storage 148 may comprise applications 150, files 157, and share program 156. Applications 150 may comprise finance 151, travel 152, calendar 153 and other applications 154. Files 157 may comprise rules 158 and lists 159. The illustrative embodiments recognize and take into account that share program 156 may enable integration of such files as finance 151, travel 152, and calendar 153 with wireless devices such as mobile device 110 in FIG. 1 and mobile devices 210 and 230 in FIG. 2.

Other computing systems 160 may comprise a number of computing systems such as vendor computing systems 161. Vendor computing systems 161 may comprise a number of vendor computing systems such as vendor computer 162. Vendor computer 162 may comprise a number of processors 163, storage 164, and connectivity 165. Storage 164 may comprise share applications 167 and rules 166. The illustrative embodiments recognize and take into account vendor computing systems 161 may provide coupons for redemption of incentives and provide information to a device that the device may not have obtained without an interaction with a vendor computing system such as vendor computing system 161.

Networks 170 may comprise internet 171, wireless 173, wire 175, and other 177. Internet 171 may comprise connectivity 172. Wireless 173 may comprise connectivity 174. Wire 175 may comprise connectivity 176. Other network 177 may comprise connectivity 178. Connectivity 172, 174, 176, and 178 may be illustrative examples of applications and hardware that may enable communication between mobile devices 104 and computing systems 130. Other networks 177 may represent any other network that is known or that may be known to persons skilled in the art and that is suitable for establishing communication between devices 104 and computing systems 130.

Figure 2:
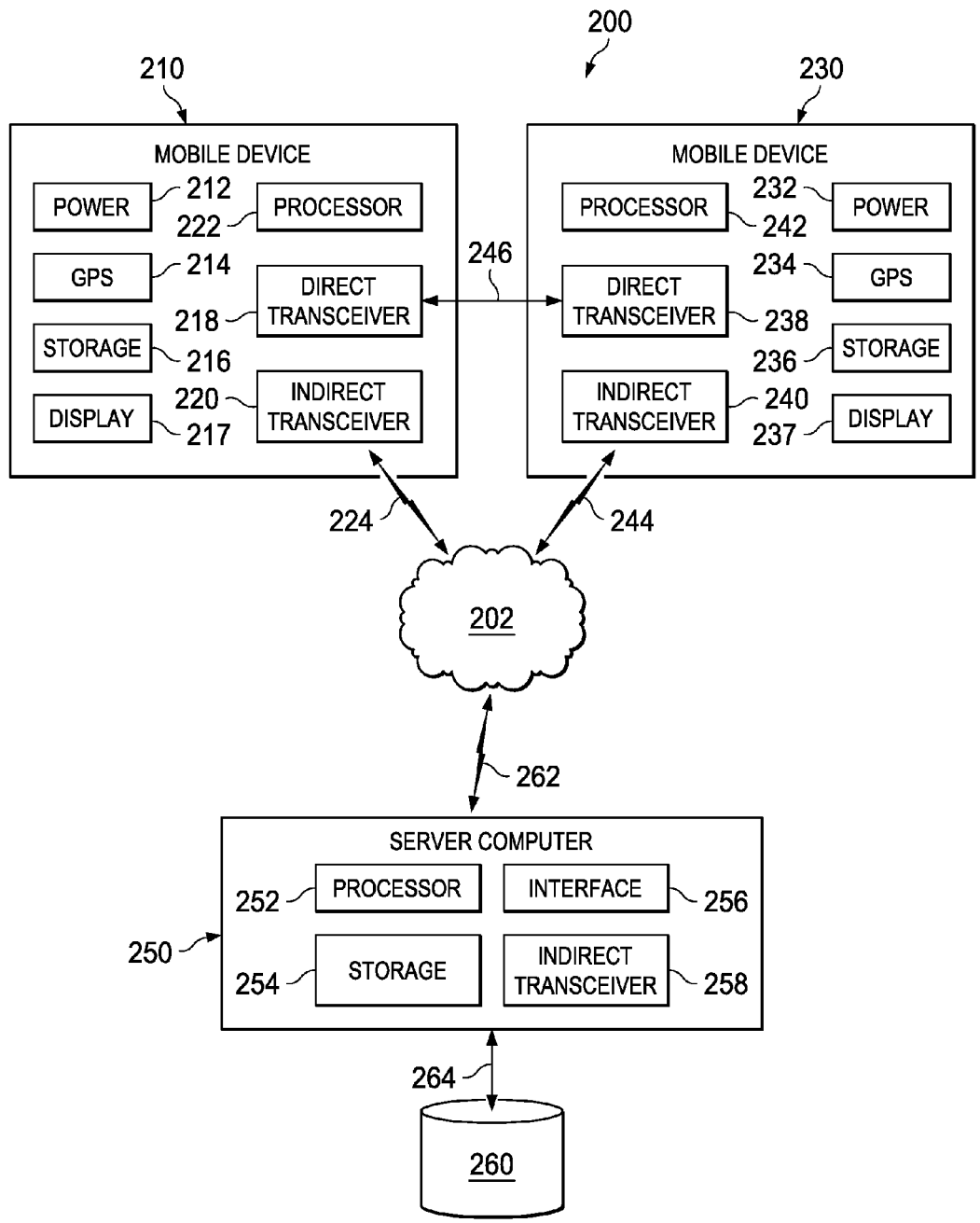
FIG. 2 is a share network in which illustrative embodiments may be implemented.
Figure 3:
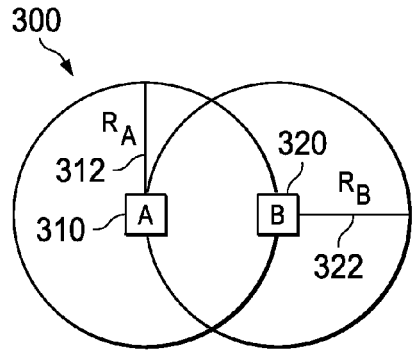
FIG. 3 is a time step diagram in conjunction with FIGS. 4-6 in which illustrative embodiments may be implemented.

Referring to FIG. 2, a share network is disclosed in which illustrative embodiments may be implemented. In the example of FIG. 2, two mobile devices, mobile device 210 and mobile device 230, may communicate with each other and with network 202. Mobile device 210 and mobile device 230 may be mobile devices such as mobile devices 104 in FIG. 1. Mobile device 210 may comprise power supply 212, geophysical positioning system 214, storage 216, direct transceiver 218, indirect transceiver 220, and processor 222. Mobile device 230 may be a similar device as mobile device 210 and may have power supply 232, geophysical positioning system 234, storage 236, direct transceiver 238, and indirect transceiver 240 and processor 242. Direct transceiver 218 of mobile device 210 may communicate directly with direct transceiver 238 of mobile device 230 by two-way wireless transmission along connection 246. Indirect transceiver 220 of mobile device 210 may communicate with network 202 by wireless connection 224. Indirect transceiver 240 of mobile device 230 may communicate with network 202 by wireless connection 244. Server computer 250 may comprise processor 252, storage 254, interface 256, and indirect transceiver 258. Server computer 250 may communicate with network 202 by wireless connection 262 and with database storage 260 by wireless connection 264. Wireless connection 262 and wireless connection 264 may be wired connections or combinations of wired and wireless connections.

Referring to FIGS. 3-6, a time step diagram is disclosed in which illustrative embodiments may be implemented. As used herein, "time step diagram" means that each figure shows a different configuration of mobile device locations representing a movement of the mobile devices over a period of time. FIGS. 3-6 may illustrate a time sequence of events in which four mobile devices, mobile device A 310, mobile device B 320, mobile device C 530, and mobile device D 610 interact based on their relative movements to locations where their direct transceivers can communicate and transmit information. The four mobile devices illustrated in FIGS. 3 through 6 may be mobile devices such as mobile devices 110 in FIG. 1 and mobile devices 210 and 230 in FIG. 2. In the illustrative example of FIG. 3, mobile device A 310 has a range represented by radius $R_A$ 312. Mobile device B 320 has a range represented by radius $R_B$ 322. In order to communicate directly each mobile device must be at a location where a circle defined by its radius at least intersects the other mobile device. The radius of each circle defines a range of mobile device A 310 and mobile device B 320.

Figure 4:
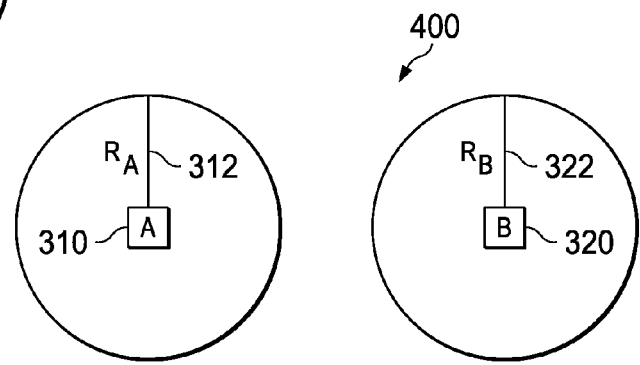
FIG. 4 is a time step diagram in conjunction with FIGS. 3, 5, and 6 in which an illustrative embodiment may be implemented.
Figure 5:
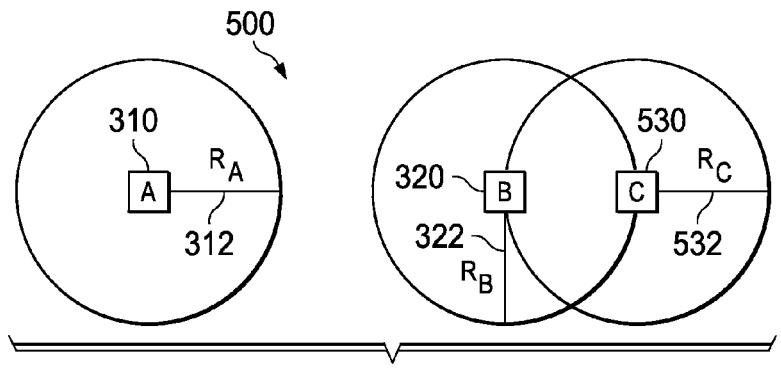
FIG. 5 is a time step diagram in conjunction with FIGS. 3-4 and 6 in which an illustrative embodiment may be implemented.
Figure 6:
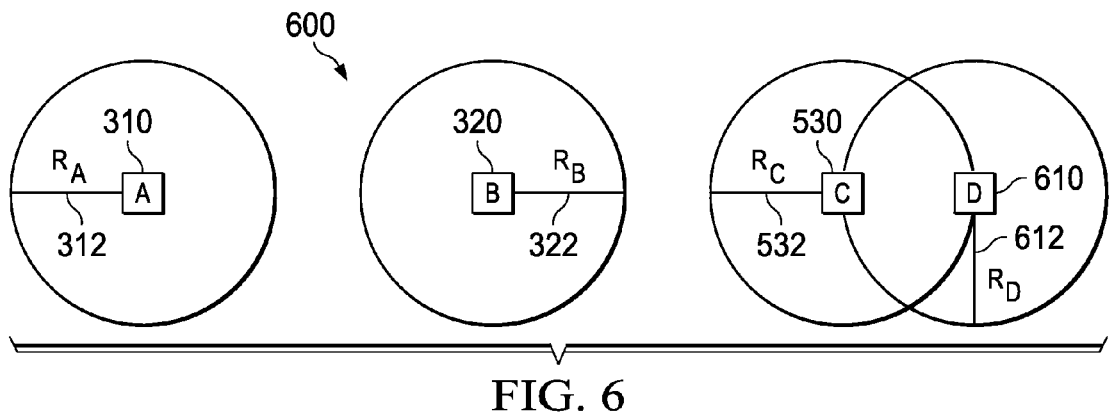
FIG. 6 is a time step diagram in conjunction with FIGS. 3-5 in which an illustrative embodiment may be implemented.

Referring to FIG. 4, mobile device A 310 and mobile device B 320 are shown to have moved apart so that neither mobile device is within range of the other. Referring to FIG. 5, mobile device A 310 and mobile device B 320 remain out of range of each other. Mobile device B 320 has moved within range of mobile device C 530. Referring to FIG. 6, mobile device C 530 has moved away from mobile device B 320 so that neither mobile device is within range of the other for direct communication. Mobile device C 330 has moved within range of mobile device D 610.

Referring to FIG. 7, a display diagram of a share environment is disclosed in accordance with the illustrative embodiments. In the example of FIG. 7, positions of a number of mobile devices may be shown at a point in time. All of the mobile devices depicted in the illustrative example of FIG. 7 may be mobile devices such as mobile devices 104 in FIG. 1 and mobile devices 210 and 230 in FIG. 2. Track 703 may extend from origin 702 to destination 704. Mobile device E 710 may be depicted at a point along track 703. Line 712 from origin 702 to mobile device E 710 may be solid to indicate that mobile device E 710 may have traversed that portion of track 703. Intended path 714 from mobile device E 710 to destination 704 may be dotted to indicate a portion of track 703 that mobile device E 710 has not yet traveled but intends to travel. Mobile device E has passed mobile device G 720 without making contact because mobile device E 710 did not close within radius $R_E$ 713 of mobile device G 720. Mobile device E 710 has come within radius $R_E$ 713 of mobile device F 715 and so can communicate with mobile device E 714. Mobile device E 714 is also within its radius $R_F$ 716 of mobile device E 710 so that mobile device F 715 can communicate with mobile device E 710. Mobile device H 722, mobile device I 726, mobile device J 730, mobile device K 732, mobile device L 740, mobile device M 744, and mobile device N 736 comprise a cluster in which each mobile device can communicate with at least one other mobile device, and in some cases with more than one mobile device. Mobile device O 764 is located beyond the range of any mobile device in the cluster and beyond the range of mobile device E 710. The illustrative embodiments recognize and take into account that clusters such as the cluster depicted in FIG. 7 may provide rapid dissemination of information as one or more files may be transmitted from one device to another as a device comes into range of another device. Such rapid dissemination is an example of viral communication. In an example, a mall or stadium may contain large numbers of mobile devices within range of each other, and provide opportunities for communication between mobile devices via direct transceivers in the mobile devices.

Figure 8B:
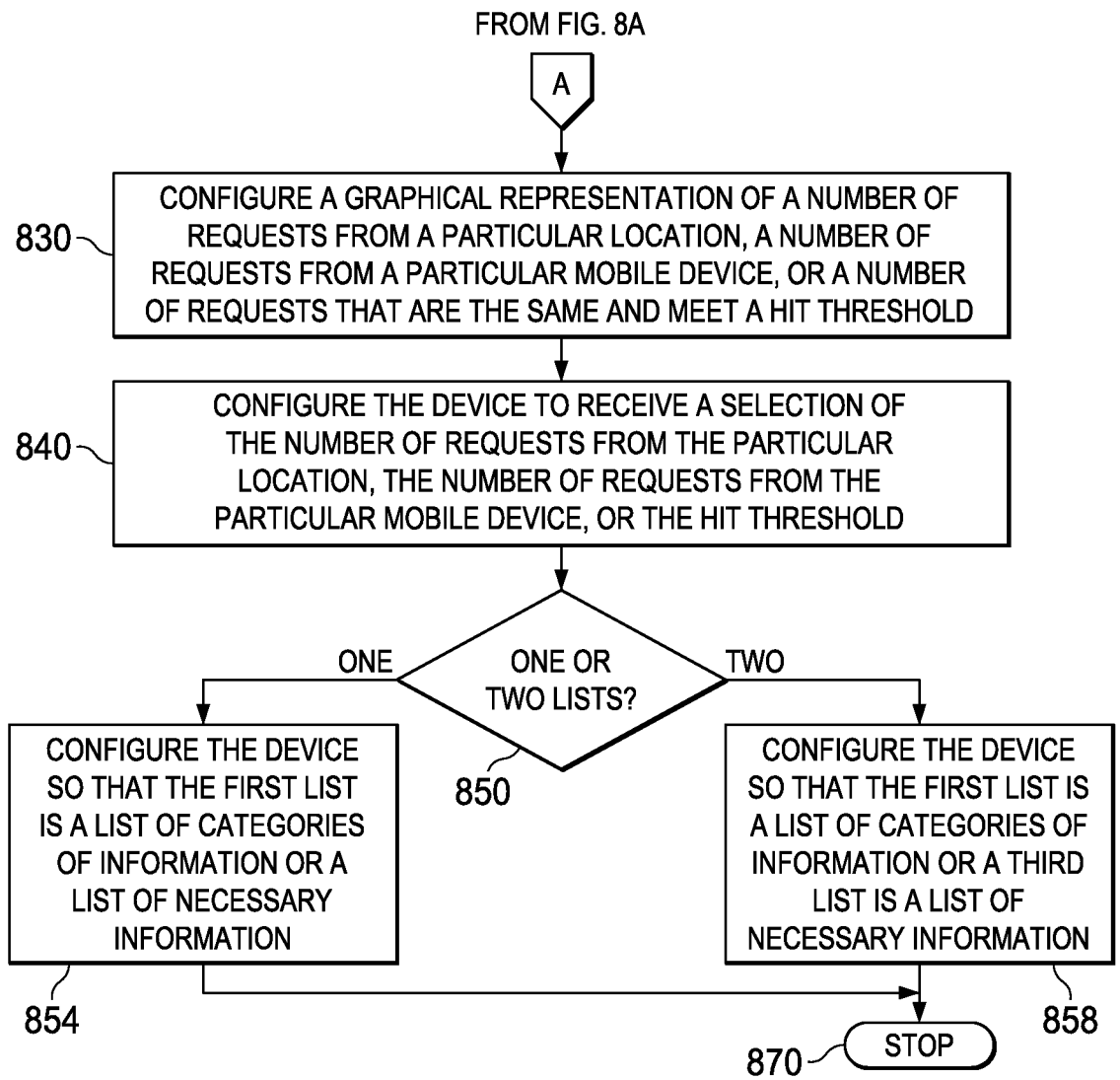

FIGS. 8A and 8B are a flowchart of a configuration process in accordance with the illustrative embodiments.

Configuration process may be a program such as configuration program 123 in storage 114 in FIG. 1 or may reside in storage 216 and storage 236 in FIG. 2. In another illustrative example, configuration process may reside in storage 137 of server 134 or in storage 148 of personal computer 145 in FIG.

1. Configuration process 800 starts (step 802) and may configure a secure two-way communication between the first mobile device and each of the number of second mobile devices by exchanging a number of signals transmitted between a first direct transceiver in the first device and a second direct transceiver in each of the second mobile devices, wherein the number of signals identify to each mobile device that the other mobile device is participating in the shared environment (step 810).

Configuration process 800 configures the criteria to be a location from which a request originated, a type of mobile device from which the request originated, or a number of a number of requests that are the same in the number of lists (step 814).

Configuration process 800 determines whether to pull data from applications or from computing systems (step 820). If a determination is made to pull data from applications, configuration process 800 configures each mobile device in the shared environment to pull data from a number of applications external to the shared environment using an indirect transceiver in each of the mobile devices, wherein the external sources comprise a number of applications on a server or a personal computer (step 824).

If at step 820 a determination is made to pull data from computing systems, configuration process 800 configures each mobile device in the shared environment to pull data from a number of external computing systems, wherein the number of external computing systems include a vendor computing system that is configured to transmit an incentive or a product information on an indirect transceiver (step 828).

Configuration process 800 configures a graphical representation of a number of requests from a particular location, a number of requests from a particular mobile device, or a number of requests that are the same and meet a hit threshold (step 830).

Configuration process 800 configures the mobile device to receive a selection of the number of requests from the particular location, the number of requests from the particular mobile device, or the hit threshold (step 840). Configuration process 800 determines whether to use one or two lists (step 850). If configuration process 800 determines to use one list, then configuration process 800 configures the mobile device so that the first list is a list of categories of information or a list of necessary information (step 854). If configuration process 800 determines to use two lists, then configuration process 800 configures the mobile device so that the first list is a list of categories of information or a third list is a list of necessary information (step 858). Configuration process 800 stops (step 870).

Figure 9:
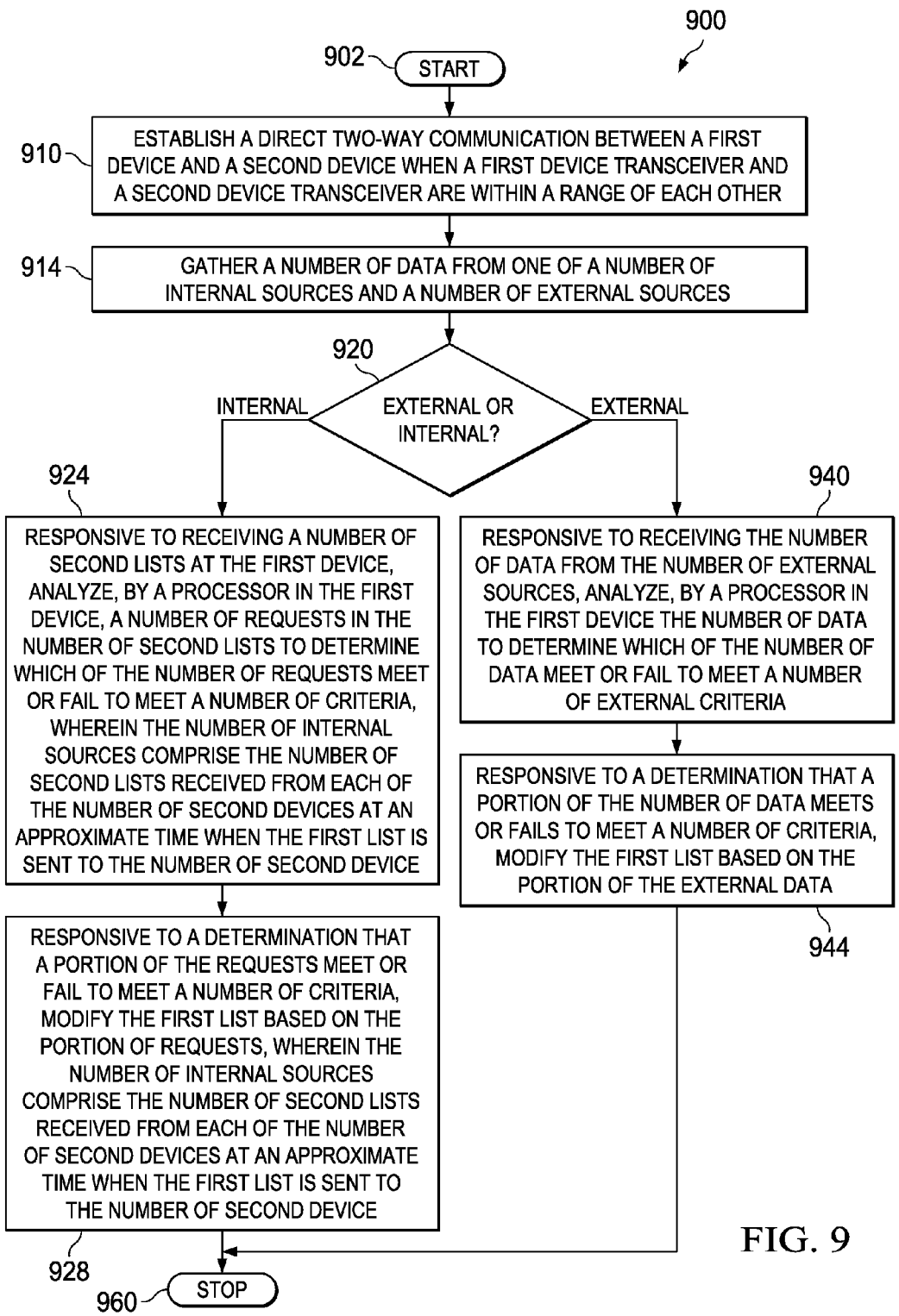
FIG. 9 is a flowchart of a shared application in accordance with the illustrative embodiments.

FIG. 9 is a flowchart of a shared application in accordance with the illustrative embodiments. Share application may be share program 156 in storage 148 of personal computer 145 in FIG. 1. Share application 900 may reside in whole or in part in one or more of applications 121 in storage 114, share applications 138 in storage 137, share application 156 in storage 148 and share applications 167 in storage 164 in FIG. 1. Share application 900 may reside in whole or in part in storage 216 and storage 236 in FIG. 2. Share Application 900 starts (step 902) and establishes a direct two-way communication between a first mobile device and a second mobile device when a first direct transceiver and a second direct transceiver are within a range of each other (step 910). The first direct transceiver may be a direct transceiver such as direct transceiver 111 in FIG. 1 and direct transceiver 218 and direct transceiver 238 in FIG. 2. Share application 900 gathers a number of data from a number of internal sources or a number of external sources (step 914). Internal sources may be other mobile devices such as mobile devices 104 in FIG. 1 and mobile devices 210 and 230 in FIG. 2. External sources may be external sources such as computing systems 130 in FIG. 1 and server 250 in FIG. 2. Share application 900 determines whether to analyze internal data or external data (step 920). If share application 900 determines to analyze internal data, share application 900 responsive to receiving a number of second lists at the first mobile device, analyzing, by a processor in the first mobile device, a number of requests in the number of second lists to determine which of the number of requests meet or fail to meet a number of criteria (step 924). Lists may be lists such as lists 115 in storage 114 in FIG. 1. The number of internal sources comprise the number of second lists received from each of the number of second mobile devices at an approximate time when the first list is sent to the number of second mobile device.

Share application 900, responsive to a determination that a portion of the requests meets or fails to meet a number of criteria, modifies the first list based on the portion of requests (step 928). If at step 920 share application 900 determines to analyze external data, share application 900, responsive to receiving the number of data from the number of external sources, analyzes the number of data to determine which of the number of data meet or fail to meet a number of external criteria (step 940). The analysis may be performed by the processor in the mobile device. Share application 900, responsive to a determination that a portion of the number of data meets or fails to meet a number of criteria, modifies the first list based on the portion of the external data (step 944). Share application 900 stops (step 960).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction running system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Java and all Java-based trademarks and logos are trademarks of Sun Microsystems, Inc. in the United States, other countries or both. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

Figure 10:
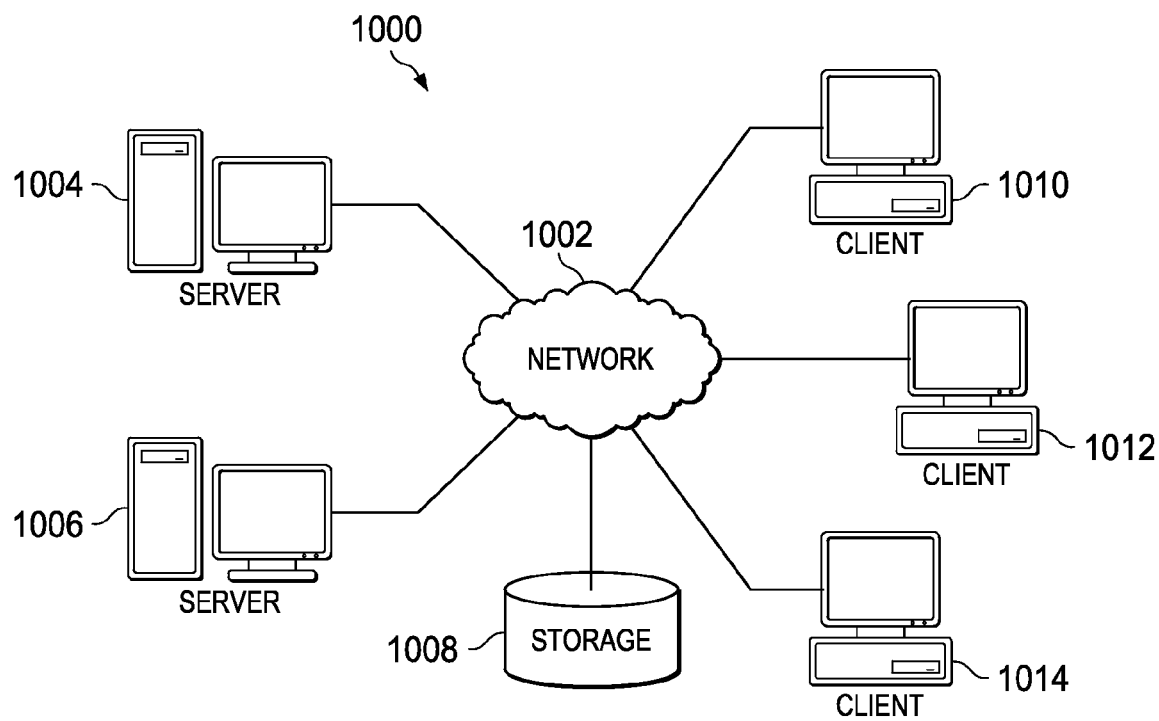
FIG. 10 is a computer network in which illustrative embodiments may be implemented.

FIG. 10 is a computer network in which illustrative embodiments may be implemented. Network data processing system 1000 is a network of computers in which the illustrative embodiments may be implemented. Network data processing system 1000 contains network 1002, which is the medium used to provide communications links between various devices and computers connected together within network data processing system 1000. Network 1002 may include connections, such as wire, wireless communication links, or fiber optic cables.

In the depicted example, server 1004 and server 1006 connect to network 1002 along with storage unit 1008. In addition, clients 1010, 1012, and 1014 connect to network 1002. Clients 1010, 1012, and 1014 may be, for example, personal computers or network computers. In the depicted example, server 1004 provides information, such as boot files, operating system images, and applications to clients 1010, 1012, and 1014. Clients 1010, 1012, and 1014 are clients to server 1004 in this example. Network data processing system 1000 may include additional servers, clients, and other devices not shown.

Program code located in network data processing system 1000 may be stored on a computer recordable storage medium and downloaded to a data processing system or other device for use. For example, program code may be stored on a computer recordable storage medium on server 1004 and downloaded to client 1010 over network 1002 for use on client 1010.

In the depicted example, network data processing system 1000 is the Internet with network 1002 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1000 also may be implemented as a number of different types of networks, such as for example, an intranet, a local area network (LAN), or a wide area network (WAN). FIG. 10 is intended as an example, and not as an architectural limitation for the different illustrative embodiments.

Figure 11:
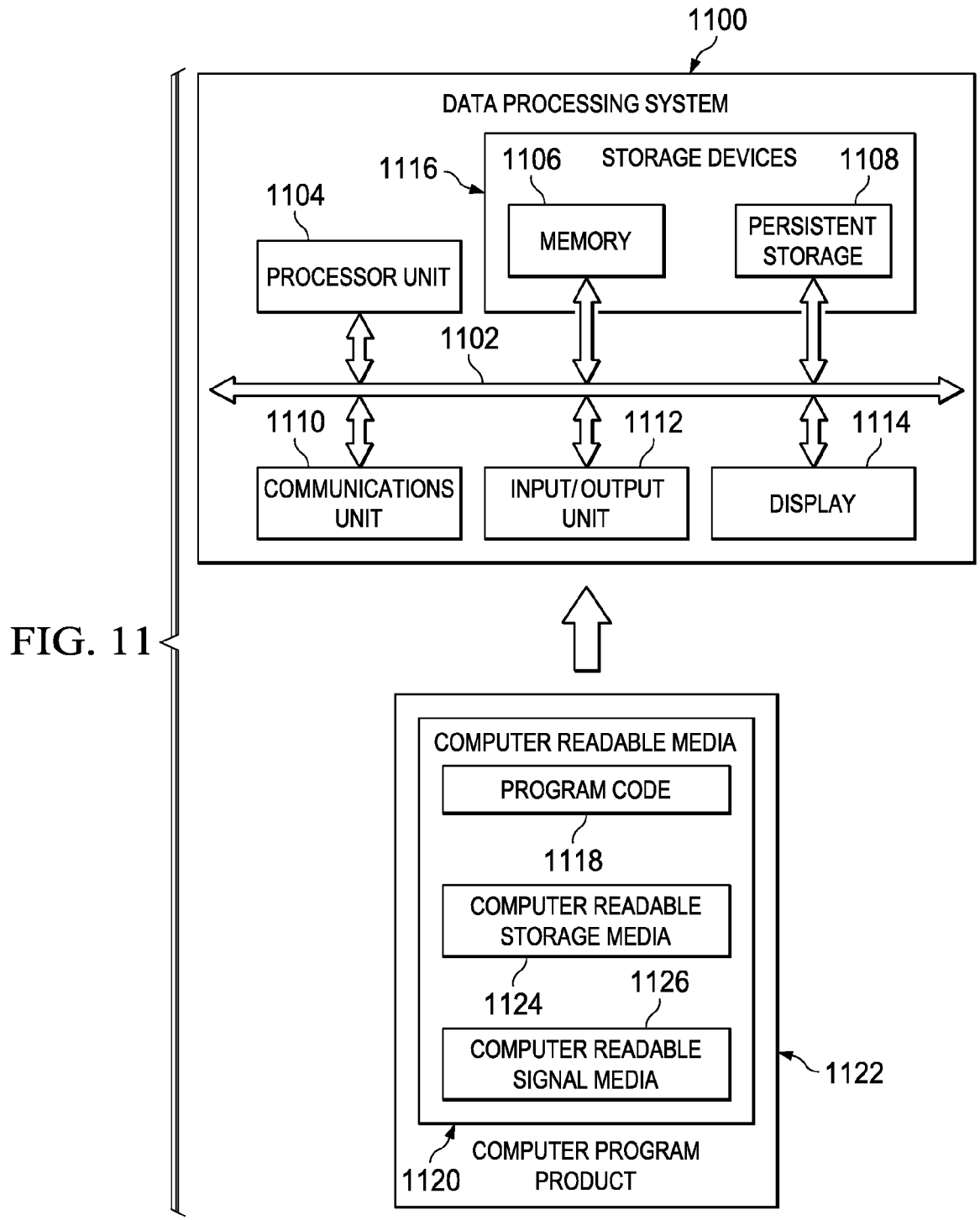
FIG. 11 is data processing system in which illustrative embodiments may be implemented.

With reference now to FIG. 11, a diagram of a data processing system is depicted in accordance with an illustrative embodiment. Data processing system 1100 is an example of a computer, such as server 1004 or client 1014 in FIG. 10, in which computer usable program code or instructions implementing the processes may be located for the illustrative embodiments. In this illustrative example, data processing system 1100 includes communications fabric 1102, which provides communications between processor unit 1104, memory 1106, persistent storage 1108, communications unit 1110, input/output (I/O) unit 1112, and display 1114.

Processor unit 1104 serves to run instructions for software that may be loaded into memory 1106. Processor unit 1104 may be a set of one or more processors or may be a multi-processor core, depending on the particular implementation. Further, processor unit 1104 may be implemented using one or more heterogeneous processor systems, in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Memory 1106, in these examples, may be, for example, a random access memory, or any other suitable volatile or non-volatile storage device. Persistent storage 1108 may take various forms, depending on the particular implementation. For example, persistent storage 1108 may contain one or more components or devices. For example, persistent storage 1108 may be a hard drive, a flash memory, a rewritable optical disk, a rewritable magnetic tape, or some combination of the above. The medium used by persistent storage 1108 may be removable. For example, a removable hard drive may be used for persistent storage 1108.

Communications unit 1110, in these examples, provides for communication with other data processing systems or devices. In these examples, communications unit 1110 is a network interface card. Communications unit 1110 may provide communications through the use of either or both physical and wireless communications links. Input/output unit 1112 allows for the input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for running by processor unit 1104. The processes of the different embodiments may be performed by processor unit 1104 using computer implemented instructions, which may be located in a memory, such as memory 1106.

These instructions are referred to as program code, computer usable program code, or computer readable program code that may be read and run by a processor in processor unit 1104. The program code, in the different embodiments, may be embodied on different physical or computer readable storage medium, such as memory 1106 or persistent storage 1108.

Program code 1118 is located in a functional form on computer readable medium 1120 that is selectively removable and may be loaded onto or transferred to data processing system 1100 for running by processor unit 1104. Program code 1118 and computer readable medium 1120 form computer program product 1122. In one example, computer readable medium 1120 may be computer readable storage medium 1124 or computer readable signal medium 1126. Computer readable storage medium 1124 may include, for example, an optical or magnetic disc that is inserted or placed into a drive or other device that is part of persistent storage 1108 for transfer onto a storage device, such as a hard drive, that is part of persistent storage 1108. Computer readable storage medium 1124 also may take the form of a persistent storage, such as a hard drive, a thumb drive, or a flash memory that is connected to data processing system 1100. In some instances, computer readable storage medium 1124 may not be removable from data processing system 1100.

Alternatively, program code 1118 may be transferred to data processing system 1100 using computer readable signal medium 1126. Computer readable signal medium 1126 may be, for example, a propagated data signal containing program code 1118. For example, computer readable signal medium 1126 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable medium also may take the form of non-tangible medium, such as communications links or wireless transmissions containing the program code.

In some illustrative embodiments, program code 1118 may be downloaded over a network to persistent storage 1108 from another device or data processing system through computer readable signal medium 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, data processing system 1100 may include organic components integrated with inorganic components and/or may be comprised entirely of organic components excluding a human being. For example, a storage device may be comprised of an organic semiconductor.

As another example, a storage device in data processing system 1100 is any hardware apparatus that may store data. Memory 1106, persistent storage 1108, and computer readable medium 1120 are examples of storage devices in a tangible form.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1106 or a cache such as found in an interface and memory controller hub that may be present in communications fabric 1102.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction running system. For the purposes of this description, a computer-usable or computer readable medium can be any tangible apparatus that can contain, store, communicate, propagate, or transport the program for use by or in connection with the instruction running system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or running program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for modifying a first list of categories of information stored in a first mobile device, the method comprising:
    establishing a direct two-way communication between the first mobile device and a second mobile device, a direct transceiver of the first mobile device being in range of a direct transceiver of the second mobile device;
    responsive to establishing the direct two-way communication, the first mobile device sending to the second mobile device the first list of categories of information stored in the first mobile device, and the second mobile device sending to the first mobile device a second list of categories of information comprising a number of requests stored in the second mobile device; and subsequently
    modifying the first list of categories of information of the first mobile device based on the second list of the second mobile device;
    responsive to establishing a direct two-way communication between the first mobile device and a third mobile device, automatically sending the modified first list of categories of information from the first mobile device to the third mobile device.

2. The method of claim 1, wherein the step of modifying the first list further comprises:
    responsive to receiving the second list of categories of information at the first mobile device, analyzing, by a processor in the first mobile device, the number of requests in the second list of categories of information to determine which of the number of requests meet or fail to meet a number of criteria.

3. The method of claim 2 further comprising:
    displaying a graphical representation of a number of requests from a particular location, a number of requests from a particular mobile device, and a number of requests that are the same and meet a hit threshold; and
    responsive to displaying the graphical representation, receiving a selection of the number of requests from the particular location, the number of requests from the particular mobile device, or the hit threshold.

4. The method of claim 1, wherein the step of modifying the first list further comprises:
    responsive to a determination that one or more requests of the number of requests in the second list of categories of information meet or fail to meet a number of criteria, modifying the first list of categories of information based on the one or more requests.

5. The method of claim 1, comprising:
    configuring the criteria to be a location from which a request of the number of requests originated, a type of mobile device from which the request of the number of requests originated, or a number of the number of requests that are the same in the number of lists.

6. The method of claim 1, comprising:
    configuring each mobile device to pull data from a number of applications external to each of the mobile device using an indirect transceiver in each of the mobile devices, wherein the a number of applications are on a server or a personal computer, and wherein an application of the number of applications comprises a financial application providing credit card transaction data, a travel application providing flight reservation data, a calendar application that provides data on event times, or a tracking application providing locations of the first mobile device from a geophysical positioning system in the first mobile device.

7. The method of claim 1 further comprising:
configuring each mobile device to pull data from a number of external computing systems, wherein the number of external computing systems include a vendor computing system that is configured to transmit an incentive or a product information on an indirect transceiver.

8. The method of claim 1 further comprising:
providing a secure two-way communication between the first mobile device and each of the number of second devices by exchanging a number of signals transmitted between a first mobile device direct transceiver in the first mobile device and a second mobile device direct transceiver in each of the second devices, wherein the number of signals identify to each mobile device that the first mobile device is participating in a shared environment.

9. A computer system for modifying a first list of categories of information stored in a first mobile device, the system comprising:
a processor, a computer readable memory, and a computer readable storage medium;
first program instructions for establishing a direct two-way communication between the first mobile device and a second mobile device, a direct transceiver of the first mobile device being in range of a direct transceiver of the second mobile device;
second program instructions for, responsive to establishing the direct two-way communication, the first mobile device sending to the second mobile device the first list of categories of information stored in the first mobile device, and the second mobile device sending to the first mobile device a second list of categories of information comprising a number of requests stored in the second mobile device; and subsequently
third program instructions for modifying the first list of categories of information of the first mobile device based on the second list of the second mobile device;
fourth program instructions for, responsive to establishing a direct two-way communication between the first mobile device and a third mobile device, automatically sending the modified first list of categories of information from the first mobile device to the third mobile device;
wherein the first, second, third, and fourth program instructions are stored on the computer readable storage medium for running by the processor via the computer readable memory.

10. The computer system of claim 9, wherein the third program instructions for modifying the first list further comprises:
responsive to receiving the second list of categories of information at the first mobile device, analyzing, by a processor in the first mobile device, the number of requests in the second list of categories of information to determine which of the number of requests meet or fail to meet a number of criteria.

11. The computer system of claim 9, wherein the third program instructions for modifying the first list further comprises:
responsive to a determination that one or more requests of the number of requests in the second list of categories of information meet or fail to meet a number of criteria, modifying the first list of categories of information based on the one or more requests.

12. The computer system of claim 9 further comprising:
fifth program instructions for configuring the criteria to be a location from which a request originated, a type of mobile device from which the request originated, or a number of a number of requests that are the same in the number of lists;
wherein the fifth program instructions are stored on the computer readable storage medium.

13. The computer system of claim 9, further comprising:
sixth program instructions for configuring each mobile device to pull data from a number of applications external to each of the mobile device using an indirect transceiver in each of the mobile devices, wherein the number of applications are on a server or a personal computer, and wherein an application of the number of applications comprises a financial application providing credit card transaction data, a travel application providing flight reservation data, a calendar application that provides data on event times, or a tracking application providing locations of the first mobile device from a geophysical positioning system in the first mobile device;
wherein the sixth program instructions are stored on the computer readable storage medium for running by the processor via the computer readable memory.

14. The computer system of claim 9 further comprising:
seventh program instructions for configuring each mobile device in the shared environment to pull data from a number of external computing systems, wherein the number of external computing systems include a vendor computing system that is configured to transmit an incentive or a product information on an indirect transceiver;
wherein the seventh program instructions are stored on the computer readable storage medium for running by the processor via the computer readable memory.

15. The computer system of claim 9 further comprising:
eighth program instructions for providing a secure two-way communication between the first mobile device and each of the number of second devices by exchanging a number of signals transmitted between a first mobile device direct transceiver in the first mobile device and a second mobile device direct transceiver in each of the second devices, wherein the number of signals identify to each mobile device that the first mobile device is participating in a shared environment;
wherein the eighth program instructions are stored on the computer readable storage medium for running by the processor via the computer readable memory.

16. The computer system of claim 9 further comprising:
ninth program instructions for displaying a graphical representation of a number of requests from a particular location, a number of requests from a particular mobile device, and a number of requests that are the same and meet a hit threshold; and
tenth program instructions for, responsive to displaying the graphical representation, receiving a selection of the number of requests from the particular location, the number of requests from the particular mobile device, or the hit threshold;
wherein the ninth and tenth program instructions are stored on the computer readable storage medium for running by the processor via the computer readable memory.

17. A computer program product for modifying a first list of categories of information stored in a first mobile device, the computer program product comprising:
- a computer readable storage medium;
- first program instructions for establishing a direct two-way communication between the first mobile device and a second mobile device, a direct transceiver of the first mobile device being in range of a direct transceiver of the second mobile device;
- second program instructions for, responsive to establishing the direct two-way communication, the first mobile device sending to the second mobile device the first list of categories of information stored in the first mobile device, and the second mobile device sending to the first mobile device a second list of categories of information comprising a number of requests stored in the second mobile device; and subsequently
- third program instructions for modifying the first list of categories of information of the first mobile device based on the second list of the second mobile device;
- fourth program instructions for, responsive to establishing a direct two-way communication between the first mobile device and a third mobile device, automatically sending the modified first list of categories of information from the first mobile device to the third mobile device;
- wherein the first, second, third, and fourth program instructions are stored on the computer readable storage medium.

18. The computer program product of claim 17, wherein the third program instructions for modifying the first list further comprises:
- responsive to receiving the second list of categories of information at the first mobile device, analyzing, by a processor in the first mobile device, the number of requests in the second list of categories of information to determine which of the number of requests meet or fail to meet a number of criteria; and; and
- responsive to a determination that one or more requests of the number of requests in the second list of categories of information meet or fail to meet a number of criteria, modifying the first list of categories of information based on the one or more requests.

19. The computer program product of claim 17 further comprising:
- fifth program instructions for configuring the criteria to be a location from which a request originated, a type of mobile device from which the request originated, or a number of a number of requests that are the same in the number of lists;
- wherein the fifth program instructions are stored on the computer readable storage medium.

20. The computer program product of claim 17 further comprising:
- sixth program instructions for configuring each mobile device to pull data from a number of applications external to each of the mobile device using an indirect transceiver in each of the mobile devices, wherein the number of applications are on a server or a personal computer, and wherein an application of the number of applications comprises a financial application providing credit card transaction data, a travel application providing flight reservation data, a calendar application that provides data on event times, or a tracking application providing locations of the first mobile device from a geophysical positioning system in the first mobile device;
- seventh program instructions for configuring each mobile device in the shared environment to pull data from a number of external computing systems, wherein the number of external computing systems include a vendor computing system that is configured to transmit an incentive or a product information on an indirect transceiver;
- eighth program instructions for providing a secure two-way communication between the first mobile device and each of the number of second devices by exchanging a number of signals transmitted between a first mobile device direct transceiver in the first mobile device and a second mobile device direct transceiver in each of the second devices, wherein the number of signals identify to each mobile device that the first mobile device is participating in a shared environment;
- ninth program instructions for displaying a graphical representation of a number of requests from a particular location, a number of requests from a particular mobile device, and a number of requests that are the same and meet a hit threshold; and
- tenth program instructions for, responsive to displaying the graphical representation, receiving a selection of the number of request from the particular location, the number of requests from the particular mobile device, or the hit threshold;
- wherein the sixth through the tenth program instructions are stored on the computer readable storage medium.

* * * * *